(12) United States Patent
Brown, Jr.

(10) Patent No.: US 6,575,322 B1
(45) Date of Patent: Jun. 10, 2003

(54) CONTAINER FOR REMOVABLE WINDOWS OF A SOFT TOP VEHICLE

(76) Inventor: Larry J. Brown, Jr., 510 Church St., Watertown, NY (US) 13601

( * ) Notice: Subject to any disclaimer, the term of this patent is extended or adjusted under 35 U.S.C. 154(b) by 0 days.

(21) Appl. No.: 10/308,982

(22) Filed: Dec. 3, 2002

(51) Int. Cl.⁷ .................................................. B65D 6/28
(52) U.S. Cl. ...................... 220/4.22; 206/769; 220/523
(58) Field of Search ............................... 220/4.22, 4.23; 206/769, 771, 772

(56) References Cited

U.S. PATENT DOCUMENTS

| | | | |
|---|---|---|---|
| 2,867,353 A | * 1/1959 | Botham | 206/756 |
| 3,658,358 A | 4/1972 | Baker | |
| 4,049,312 A | 9/1977 | Rudbeck | |
| 4,406,587 A | * 9/1983 | Perry | 417/211 |
| 4,541,528 A | * 9/1985 | Holmes | 206/0.82 |
| 4,573,731 A | 3/1986 | Knaack et al. | |
| 4,615,464 A | * 10/1986 | Byrns | 220/4.23 |
| 4,969,678 A | 11/1990 | Loisel | |
| 5,263,757 A | 11/1993 | Reed | |
| 5,285,942 A | * 2/1994 | Wills | 224/328 |
| 5,387,064 A | 2/1995 | Cardinal | |
| 5,395,019 A | 3/1995 | Christensen | |
| 5,464,264 A | 11/1995 | Wilson | |
| 5,709,329 A | 1/1998 | Johnson | |
| 5,755,311 A | * 5/1998 | Younessian et al. | 190/114 |
| 5,860,550 A | * 1/1999 | Miller et al. | 220/4.23 |
| 6,082,545 A | * 7/2000 | Ford et al. | 206/579 |
| 6,129,229 A | * 10/2000 | Dunn et al. | 220/4.22 |
| 6,131,760 A | * 10/2000 | Huang | 220/526 |
| 6,321,911 B1 | * 11/2001 | Raimer et al. | 206/509 |

\* cited by examiner

*Primary Examiner*—Joseph M. Moy
(74) *Attorney, Agent, or Firm*—Donald R. Schoonover

(57) ABSTRACT

A special container is sized and adapted to store windows that are used in a soft top vehicle, such as a Jeep Wrangler® land vehicle. The container stores the windows in a safe and secure manner and can be placed in the vehicle so the removed windows will be accessible in the event they must be replaced. The container includes two openings that accommodate rear seat anchors, such as in a Jeep Wrangler®.

2 Claims, 3 Drawing Sheets

CONTAINER FOR REMOVABLE WINDOWS OF A SOFT TOP VEHICLE

BACKGROUND OF THE INVENTION

1. Field of the Invention

The present invention relates to the general art of special containers, and to the particular field of special containers for use with land vehicles.

2. Discussion of the Related Art

Many land vehicles have soft tops. For example, the Jeep Wrangler has a soft top. These tops can be removed if the driver or the occupants of a vehicle desire an open top for the vehicle, such as when the weather is pleasant. The tops can be replaced when the weather becomes inclement. This versatility is much desired by the driving public.

Soft tops for vehicles such as the Jeep Wrangler® also include windows that can be opened even when the top is in place. These windows are often zippered in place. Often, when the weather is "in between," a soft top is in place with the windows open. This provides still further versatility to the vehicle.

In some instances, the windows can be completely removed to provide still further versatility to the vehicle.

However, when the windows are removed, the removed windows must be stored somewhere. These windows are generally made of transparent material and may be scratched if not properly stored. Vehicle owners generally try to avoid scratching the windows of such vehicles. Therefore, some vehicle owners actually elect to leave the windows at home when they intend to drive with the top off, or with the windows open. This option works well if the weather does not change during the drive. On the other hand, if the windows are removed and stored in the vehicle in the event of a change in weather, the possibility of scratching the windows increases. Thus, some vehicle owners perform a balancing of the two options of leaving the windows at home or taking a chance of scratching the windows if the windows are kept in the vehicle.

Therefore there is a need for a means for permitting a vehicle owner to store windows associated with a soft top in the vehicle while protecting those stored windows from scratching during storage.

While many containers can be used to store items such as soft top windows, the inventor is not aware of any such special container that is specifically designed to store such items in the vehicle.

Therefore, there is a need for a container which will store windows associated with a soft top vehicle, such as a Jeep Wrangler®.

PRINCIPAL OBJECTS OF THE INVENTION

It is a main object of the present invention to provide a means for permitting a vehicle owner to store windows associated with a soft top in the vehicle while protecting those stored windows from scratching during storage.

It is another object of the present invention to provide a container which will store windows associated with a soft top vehicle, such as a Jeep Wrangler®.

SUMMARY OF THE INVENTION

These, and other, objects are achieved by a special container that is sized and shaped to accommodate the windows associated with a soft top vehicle, such as a Jeep Wrangler® land vehicle. The container has special cutouts that permit the container to be attached to rear seat anchors, as in a Jeep Wrangler®, and further includes a padded lining for further protecting the stored windows from scratching and felt panels that separate one stored window from another.

The windows are safely stored in the container and the container is securely fixed to the vehicle so the windows will not be scratched by other objects, such as by adjacent windows during storage. In this manner, a vehicle owner can take windows with him during a drive and can safely remove the windows when desired with the knowledge that the windows can be safely stored in the vehicle. The owner does not have to guess whether the windows will be needed or not.

BRIEF DESCRIPTION OF THE DRAWING FIGURES

DETAILED DESCRIPTION OF THE PREFERRED EMBODIMENT

Figure 1:
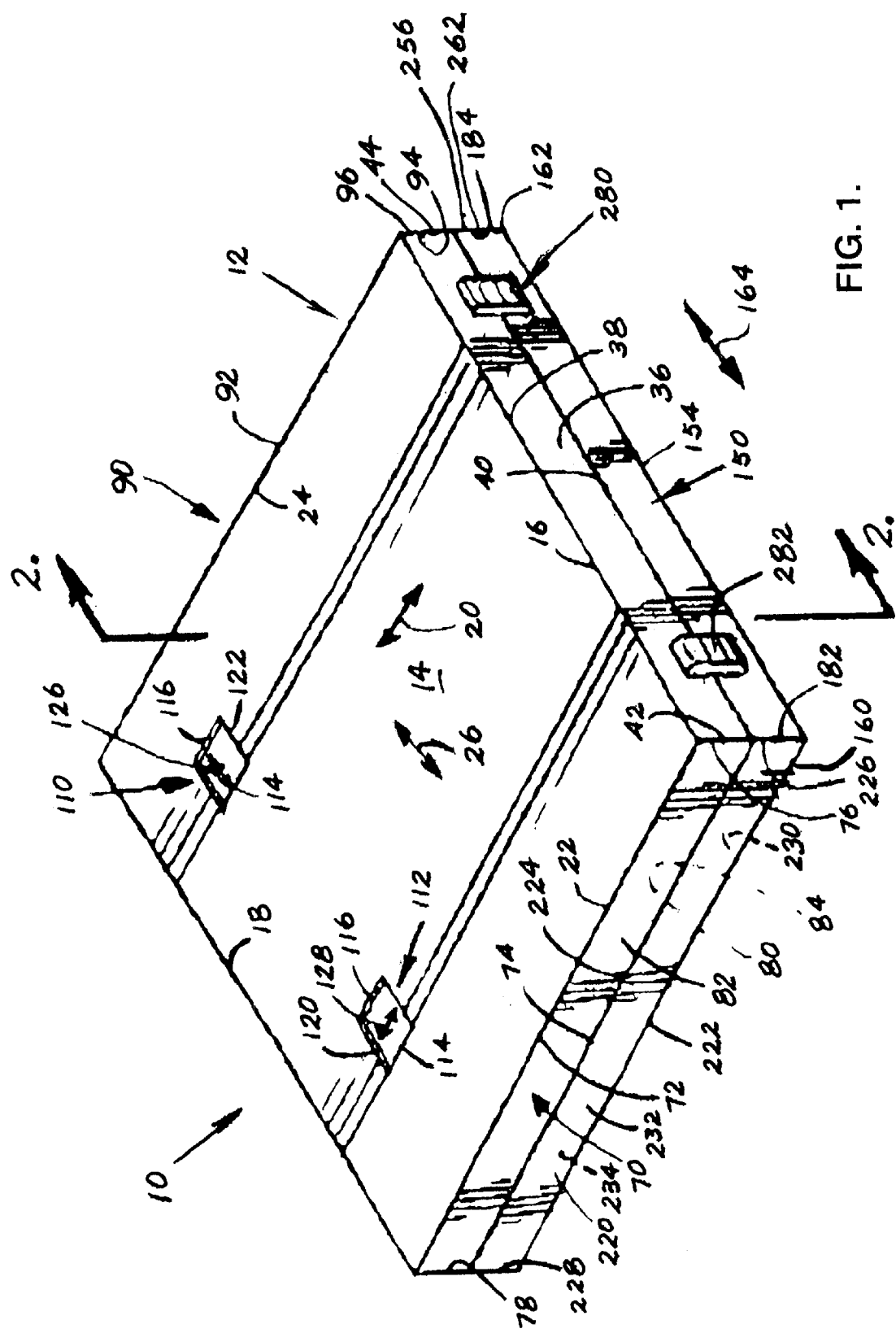
FIG. 1 is a perspective view of a special container embodying the present invention.

Other objects, features and advantages of the invention will become apparent from a consideration of the following detailed description and the accompanying drawings.

Referring to the figures, it can be understood that the present invention is embodied in a special container 10 for storing land vehicle soft top windows, in particular for storing the windows for a Jeep Wrangler®. Container 10 comprises a top unit 12 which has a central body 14. Central body 14 includes a first end edge 16, a second end edge 18, and a length dimension 20 extending between the first end edge 16 and the second end edge 18. For a Jeep Wrangler®, the length dimension 20 is thirty-eight inches in order to accommodate the windows there. Central body 14 further includes a first side edge 22, a second side edge 24, and a width dimension 26 extending between the first side edge 22 and the second side edge 24. The width dimension 26 for a Jeep Wrangler® is thirty-five inches in order to accommodate the windows thereof. The central body 14 of the top unit 12 further includes an inner surface 30, an outer surface 32 and a padded lining 34 on the inner surface 30.

A first end wall 36 of the top unit 12 has a proximal side edge 38 fixed to the first end edge 16 of the central body 14, a distal side edge 40 spaced apart from the first end edge 16 of the central body 14, a first end edge 42 and a second end edge 44. The first end wall 36 of the top unit 12 has an interior surface 46 and an exterior surface 48, and padding 50 is fixed to the interior surface 46 of the first end wall 36 of the top unit 12. A second end wall 54 has a proximal side edge 56 fixed to the second end edge 18 of the central body 14, a distal side edge 58 spaced apart from the second end edge 18 of the central body 14, a first end edge 60 and a second end edge 62. The second end wall 54 of the top unit 12 has an interior surface 64, an exterior surface 66, and padding 68 located on the interior surface 64 of the second end wall 54 of the top unit 12.

A first side wall 70 has a proximal side edge 72 fixed to the first side edge 22 of the central body 14, a distal side edge 74 spaced apart from the first side edge 22 of the central body 14, a first end edge 76, and a second end edge 78. First end edge 76 of the first side wall 70 abuts first end edge 42 of the first end wall 36 and second end edge 78 of first side wall 70 abuts first end edge 60 of the second end wall 54. First side wall 70 of top unit 12 has an interior surface 80, an exterior surface 82, and padding 84 located on the interior surface 80 of the first side wall 70 of the top unit 12.

A second side wall 90 has a proximal side edge 92 fixed to the second side edge 24 of the central body 14, a distal side edge 94 spaced apart from the second side edge 24 of the central body 14, a first end edge 96 and a second end edge 98. First end edge 96 of the second side wall 90 abuts second end edge 44 of the first end wall 36 and second end edge 98 of the second side wall 90 abuts second end edge 62 of the second end wall 54. The second side wall 90 of the top unit 12 has an interior surface 100, an exterior surface 102 and padding 104 located on the interior surface 100 of the second side wall 90 of the top unit 12.

As can be understood from the figures, the distal end edges of the first side wall 70, the second side wall 90, the first end wall 36, and the second end wall 54 of the top unit 12 are all coplanar with each other.

The top unit 12 further includes a first cutout area 110 and second cutout area 112 defined through the central body 14 adjacent to the second end edge 18 of the central body 14. The first and second cutout areas 110, 112 are identical to each other. Each cutout area 110, 112 includes a first side edge 114 and a second side edge 116, with the first and second side edges 114, 116 of the cutout areas 110, 112 being oriented parallel to each other and parallel to the first and second side edges 22, 24 of the central body 14 of the top unit 12. The first side edge 114 of the first cutout area 110 is located adjacent to the first side edge 22 of the central body 14 of the top unit 12 and the second side edge 116 of the second cutout area 112 is located adjacent to the second side edge 24 of the central body 14 of the top unit 12. Each cutout area 110, 112 further includes a first end edge 120 and a second end edge 122. The first end edges 120 of the cutout areas 110, 112 are collinear with each other and parallel to the first and second end edges 16, 18 of the central body 14 of the top unit 12, the second end edges 122 of the cutout areas 110, 112 are collinear with each other and parallel to the first and second end edges 16, 18 of the central body 14 of the top unit 12. The first end edges 120 of the first and second cutouts 110, 112 are located adjacent to the second end edge 18 of the central body 14 of the top unit 12.

Each cutout area 110, 112 has a width dimension 126 extending in the direction of the width dimension 26 of the central body 14 of the top unit 12 and extends between the first side edge 114 of each cutout area 110, 112 and the second side edge 116 of each cutout area 110, 112. Each cutout area 110, 112 further has a length dimension 128 which extends in the direction of the length dimension 20 of the central body 14 of the top unit 12 and which extends between the first end edge 120 of each cutout area 110, 112 and the second end edge 122 of each cutout area 110, 112. The cutout areas 110, 112 are spaced apart from each other so that the second side edge 116 of the first cutout area 110 is spaced apart from the first side edge 114 of the second cutout area 112 measured in the direction of the width dimension 26 of the central body 14 of the top unit 12 in order to accommodate the seat anchors which, for a Jeep Wrangler®, is a distance of twenty-two inches. For a Jeep Wrangler®, each cutout area 110, 112 has a length dimension 128 of two inches and a width dimension 126 of two inches in order to accommodate the seat anchors in the rear seat.

The container 10 further includes a bottom unit 150 which includes a central body 152. Central body 152 includes a first end edge 154, a second end edge 156, a length dimension 158 which extends between the first end edge 154 of the central body 152 of the bottom unit 150 and the second end edge 156 of the central body 152 of the bottom unit 150. The length dimension of the central body 152 of the bottom unit 150 is equal to the length dimension 20 of the central body 14 of the top unit 12. The central body 152 of the bottom unit 150 further includes a first side edge 160, a second side edge 162, and a width dimension 164 which extends between the first side edge 160 of the central body 152 of the bottom unit 150 and the second side edge 162 of the central body 152 of the bottom unit 150. The width dimension of the central body 152 of the bottom unit 150 is equal to the width dimension 26 of the central body 14 of the top unit 12.

The central body 152 of the bottom unit 150 further includes an inner surface 170 and an outer surface 172. A padded lining 174 is located on the inner surface 170 of the central body 152 of the bottom unit 150. The bottom unit 150 further includes a first end wall 176 with a proximal side edge 178 fixed to the first end edge 154 of the central body 152 of the bottom unit 150 and a distal side edge 180 spaced apart from the first end edge 154 of the central body 152 of the bottom unit 150. The first end wall 176 further includes a first end edge 182 and a second end edge 184. First end wall 176 of the bottom unit 150 has an interior surface 186, an exterior surface 188, and padding 190 on the interior surface 186 of the first end wall 176 of the bottom unit 150.

The bottom unit 150 further includes a second end wall 200. The bottom unit 150 has a proximal side edge 202 fixed to the second end edge 156 of the central body 152 of the bottom unit 150, a distal side edge 204 spaced apart from the second end edge 156 of the central body 152 of the bottom unit 150, a first end edge 206 and a second end edge 208. The second end wall 200 of the bottom unit 150 has an interior surface 210, an exterior surface 212, and padding 214 located on the interior surface 210 of the second end wall 200 of the bottom unit 150.

The bottom unit 150 further includes a first side wall 220 that has a proximal side edge 222 fixed to the first side edge 160 of the central body 152 of the bottom unit 150 and a distal side edge 224 spaced apart from the first side edge 160 of the central body 152 of the bottom unit 150. First side wall 220 has a first end edge 226 and a second end edge 228. First end edge 226 of the first side wall 220 of the bottom unit 150 abuts first end edge 182 of the first end wall 176 of the bottom unit 150 and second end edge 228 of first side wall 220 of the bottom unit 150 abuts first end edge 206 of the second end wall 200 of the bottom unit 150. The first side wall 220 of the bottom unit 150 has an interior surface 230, an exterior surface 232, and padding 234 located on the interior surface 230 of the first side wall 220 of the bottom unit 150.

The bottom unit 150 further includes a second side wall 250 which has a proximal side edge 252 fixed to the second side edge 162 of the central body 152 of the bottom unit 150, a distal side edge 254 spaced apart from the second side edge 162 of the central body 152 of the bottom unit 150, a first end edge 256, and a second end edge 258. First end edge 256 of the second side wall 250 of the bottom unit 150 abuts second end edge 184 of the first end wall 176 of the bottom unit 150, and second end edge 258 of the second side wall 250 abuts second end edge 208 of the second end wall 200 of the bottom unit 150. The second side wall 250 of the bottom unit 150 has an interior surface 260, an exterior surface 262, and padding 264 located on the interior surface 260 of the second side wall 250 of the bottom unit 150.

The distal end edges of the first side wall 220 of the bottom unit 150, the second side wall 250 of the bottom unit 150, the first end wall 176 of the bottom unit 150 and the second end wall 200 of the bottom unit 176 are all coplanar with each other.

Container 10 further includes a hinge unit 270 which includes three identical hinges 272 which connect the distal side edge 58 of the second end wall 54 of the top unit 12 to the distal side edge 204 of the second end wall 200 of the bottom unit 150. The three hinges 272 are spaced apart from each other in the direction of the width dimension 26 of the top unit 12.

Container 10 further includes a lock unit 280 which includes two identical locks 282 which connect the distal side edge 40 of the first end wall 36 of the top unit 12 to the distal side edge 180 of the first end wall 176 of the bottom unit 150 when the locks 282 are engaged. The top and bottom units 12, 150 can be moved away from each other to open the container 10.

An interior volume 290 is defined by the interior surface 30 of the central body 14 of the top unit 12, the interior surface 46 of the first end wall 36 of the top unit 12, the interior surface 64 of the second end wall 54 of the top unit 12, the interior surface 80 of the first side wall 70 of the top unit 12, the interior surface 100 of the second side wall 90 of the top unit 12, the interior surface 170 of the central body 152 of the bottom unit 150, the interior surface 186 of the first end wall 176 of the bottom unit 150, the interior surface 210 of the second end wall 200 of the bottom unit 150, the interior surface 230 of the first side wall 220 of the bottom unit 150, the interior surface 260 of the second side wall 250 of the bottom unit 150, when the top unit 12 and the bottom unit 150 are in abutting contact with each other. The windows of the vehicle are stored in interior volume 290.

Figure 2:
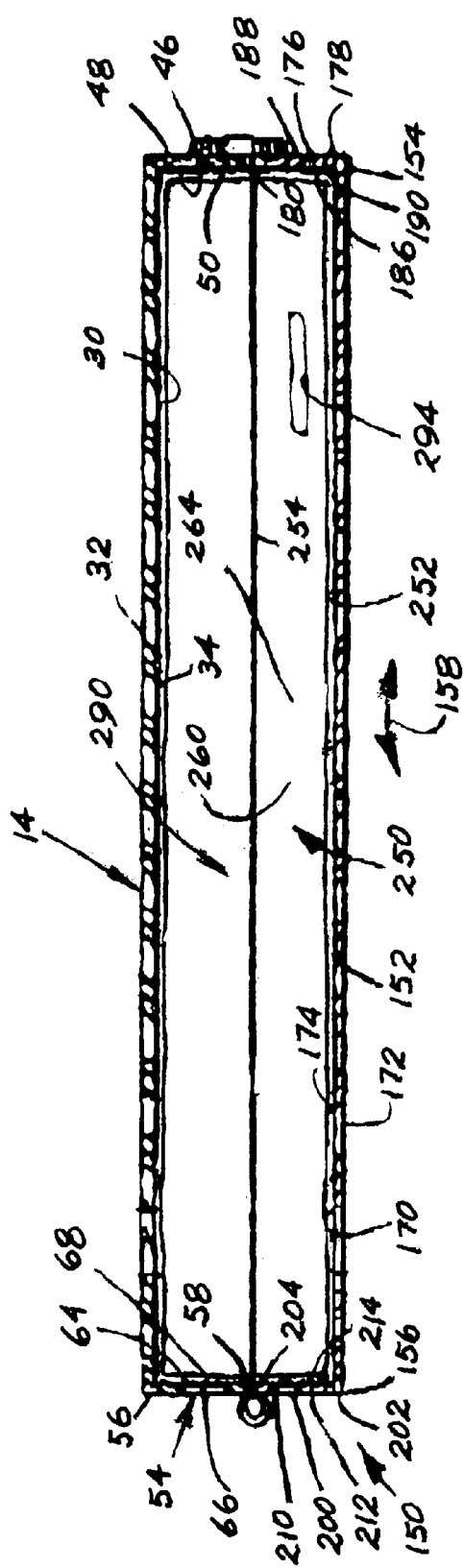
FIG. 2 is an elevational view taken along line 2—2 of FIG. 1.
Figure 3:
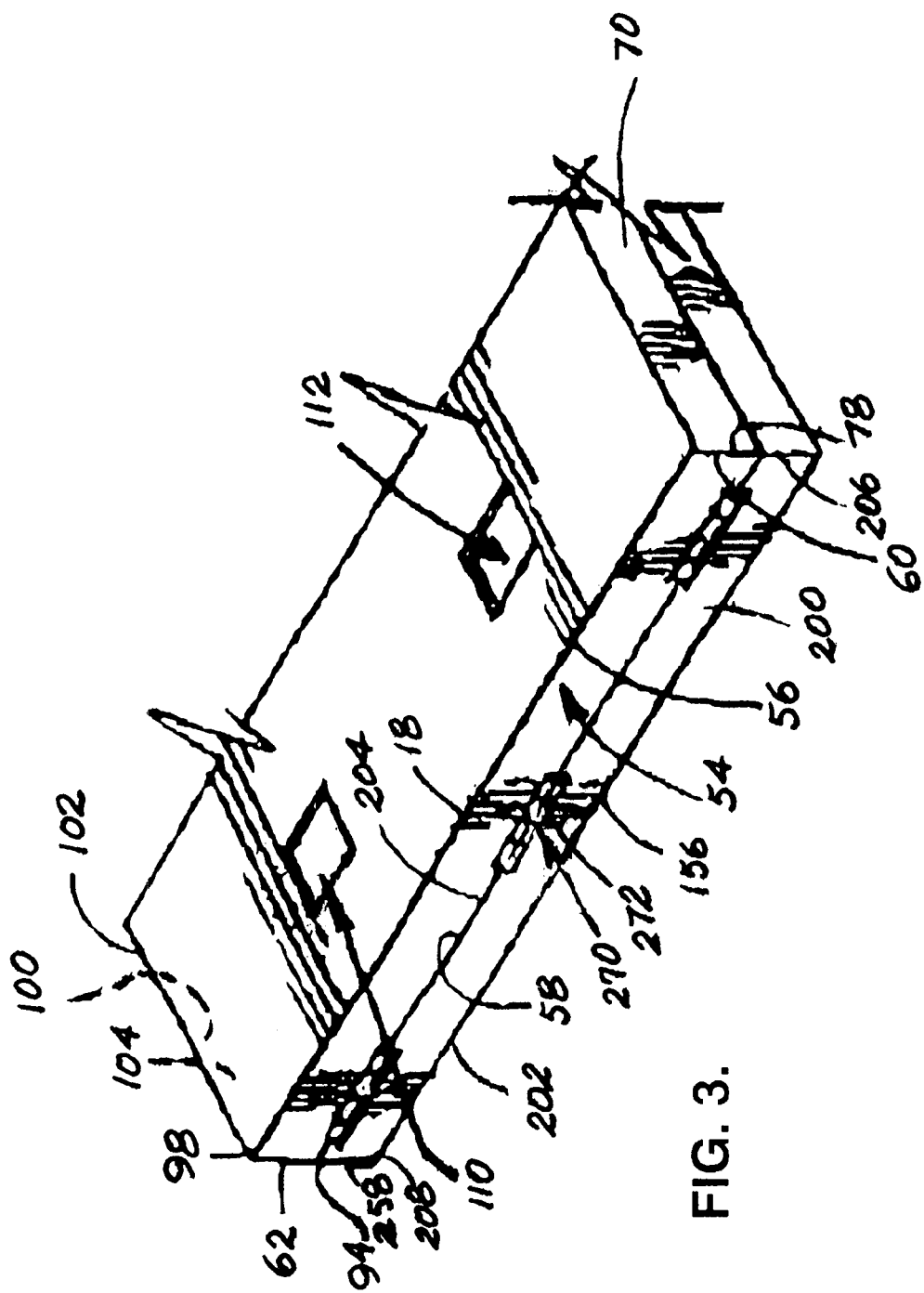
FIG. 3 is a partial rear perspective view of the special container embodying the present invention.

A plurality of dividing panels, such as dividing panel 294 which is schematically shown in FIG. 2, are located in the interior volume 290. Several dividing panels 294 can be used and each dividing panel 294 is placed between two adjacent windows to prevent the windows from scratching each other. Each of the dividing panels 294 has a width dimension essentially equal to the width dimension 26 of the top unit 12 and a length dimension essentially equal to the length dimension 20 of the top unit 12. The panels 294 are formed of material that is similar to the padding and is of the type that will not scratch the windows when the windows are stored in the container 10. The padding also protects the stored windows from being scratched by the container 10 and by other elements, including other windows, during storage.

It is understood that while certain forms of the present invention have been illustrated and described herein, it is not to be limited to the specific forms or arrangements of parts described and shown.

What is claimed and desired to be covered by Letters Patent is:

1. A special container for storing land vehicle soft top windows comprising:
   a) a top unit having
   (1) a central body which includes
      (A) a first end edge,
      (B) a second end edge,
      (C) a length dimension extending between the first end edge and the second end edge,
      (D) a first side edge,
      (E) a second side edge,
      (F) a width dimension extending between the first side edge and the second side edge,
      (G) an inner surface,
      (H) an outer surface, and
      (I) a padded lining on the inner surface,
   (2) a first end wall having a proximal side edge fixed to the first end edge of the central body, a distal side edge spaced apart from the first end edge of the central body, a first end edge and a second end edge, the first end wall of said top unit having an interior surface and an exterior surface and padding on the interior surface of the first end wall of said top unit,
   (3) a second end wall having a proximal side edge fixed to the second end edge of the central body, a distal side edge spaced apart from the second end edge of the central body, a first end edge and a second end edge, the second end wall of said top unit having an interior surface, an exterior surface and padding on the interior surface of the second end wall of said top unit,
   (4) a first side wall having a proximal side edge fixed to the first side edge of the central body, a distal side edge spaced apart from the first side edge of the central body, a first end edge and a second end edge, the first end edge of the first side wall abutting the first end edge of the first end wall and the second end edge of first side wall abutting the first end edge of the second end wall, the first side wall of said top unit having an interior surface, an exterior surface and padding on the interior surface of the first side wall of said top unit,
   (5) a second side wall having a proximal side edge fixed to the second side edge of the central body, a distal side edge spaced apart from the second side edge of the central body, a first end edge and a second end edge, the first end edge of the second side wall abutting the second end edge of the first end wall and the second end edge of the second side wall abutting the second end edge of the second end wall, the second side wall of said top unit having an interior surface, an exterior surface and padding on the interior surface of the second side wall of said top unit,
   (6) the distal end edges of the first side wall, the second side wall, the first end wall and the second end wall of said top unit all being coplanar with each other, and
   (7) first and second cutout areas defined through the central body adjacent to the second end edge of the central body of said top unit, the first and second cutout areas being identical to each other and each cutout area including
      (A) a first side edge and a second side edge with the first and second side edges of the cutout areas being oriented parallel to each other and parallel to the first and second side edges of the central body of said top unit, the first side edge of the first cutout area being located adjacent to the first side edge of the central body of said top unit and the second side edge of the second cutout area being located adjacent to the second side edge of the central body of said top unit,
      (B) a first end edge and a second end edge, with the first end edges of the cutout areas being collinear with each other and parallel to the first and second end edges of the central body of said top unit, the second end edges of the cutout areas being collinear with each other and parallel to the first and second end edges of the central body of said top unit, the first end edges of the first and second cutouts being located adjacent to the second end edge of the central body of said top unit, (C) each cutout area having a width dimension extending in the direction of the width dimension of the central body of said top unit and extending between the first side edge of each cutout area and the second side edge of each cutout area, (D) each cutout area having a length dimension extending in the direction of the length dimension of the central body of said top unit and extending between the first end edge of each cutout area and the second end edge of each cutout area, (E) the cutout areas being spaced apart from each other so that the second side edge of the first cutout area is spaced apart from the first side edge of the second cutout area by a distance of twenty-two inches measured in the direction of the width dimension of the central body of said top unit, (F) each cutout area having a length dimension of two inches, and (G) each cutout area having a width dimension of two inches;

b) a bottom unit which includes (1) a central body which includes (A) a first end edge, (B) a second end edge, (C) a length dimension extending between the first end edge of the central body of said bottom unit and the second end edge of the central body of said bottom unit, the length dimension of the central body of said bottom unit being equal to the length dimension of the central body of said top unit, (D) a first side edge, (E) a second side edge, (F) a width dimension extending between the first side edge of the central body of said bottom unit and the second side edge of the central body of said bottom unit, the width dimension of the central body of said bottom unit being equal to the width dimension of the central body of said top unit, (G) an inner surface, (H) an outer surface, and (I) a padded lining on the inner surface of the central body of said bottom unit, (2) a first end wall having a proximal side edge fixed to the first end edge of the central body of said bottom unit, a distal side edge spaced apart from the first end edge of the central body of said bottom unit, a first end edge and a second end edge, the first end wall of said bottom unit having an interior surface, an exterior surface and padding on the interior surface of the first end wall of said bottom unit, (3) a second end wall having a proximal side edge fixed to the second end edge of the central body of said bottom unit, a distal side edge spaced apart from the second end edge of the central body of said bottom unit, a first end edge and a second end edge, the second end wall of said bottom unit having an interior surface, an exterior surface and padding on the interior surface of the second end wall of said bottom unit, (4) a first side wall having a proximal side edge fixed to the first side edge of the central body of said bottom unit, a distal side edge spaced apart from the first side edge of the central body of said bottom unit, a first end edge and a second end edge, the first end edge of the first side wall of said bottom unit abutting the first end edge of the first end wall of said bottom unit and the second end edge of first side wall of said bottom unit abutting the first end edge of the second end wall of said bottom unit, the first side wall of said bottom unit having an interior surface, an exterior surface and padding on the interior surface of the first side wall of said bottom unit, (5) a second side wall having a proximal side edge fixed to the second side edge of the central body of said bottom unit, a distal side edge spaced apart from the second side edge of the central body of said bottom unit, a first end edge and a second end edge, the first end edge of the second side wall of said bottom unit abutting the second end edge of the first end wall of said bottom unit and the second end edge of the second side wall abutting the second end edge of the second end wall of said bottom unit, the second side wall of said bottom unit having an interior surface, an exterior surface and padding on the interior surface of the second side wall of said bottom unit, (6) the distal end edges of the first side wall of said bottom unit, the second side wall of said bottom unit, the first end wall of said bottom unit and the second end wall of said bottom unit all being coplanar with each other;

c) a hinge unit which includes three hinges connecting the distal side edge of the second end wall of said top unit to the distal side edge of the second end wall of said bottom unit, the three hinges being spaced apart from each other in the direction of the width dimension of said top unit;

d) a lock unit which includes two locks connecting the distal side edge of the first end wall of said top unit to the distal side edge of the first end wall of said bottom unit;

e) an interior volume defined by the interior surface of the central body of said top unit, the interior surface of the first end wall of said top unit, the interior surface of the second end wall of said top unit, the interior surface of the first side wall of said top unit, the interior surface of the second side wall of said top unit, the interior surface of the central body of said bottom unit, the interior surface of the first end wall of said bottom unit, the interior surface of the second end wall of said bottom unit, the interior surface of the first side wall of said bottom unit, the interior surface of the second side wall of said bottom unit, when said top unit and said bottom unit are in abutting contact with each other; and f) a dividing panel located in said interior volume.

2. The container as described in claim 1 wherein the width dimension of said top unit thirty-five inches and the length dimension of said top unit is thirty-eight inches.

* * * * *